(12) United States Patent
Jangid et al.

(10) Patent No.: US 12,026,475 B2
(45) Date of Patent: Jul. 2, 2024

(54) PREDICTING SERVICE ISSUES

(71) Applicant: Hewlett-Packard Development Company, L.P., Spring, TX (US)

(72) Inventors: Abhishek Jangid, Pune (IN); Mohit Sonje, Pune (IN); Ravindra Ramtekkar, Pune (IN); Narendra Kumar Chincholikar, Pune (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 266 days.

(21) Appl. No.: 17/683,556

(22) Filed: Mar. 1, 2022

(65) Prior Publication Data

US 2022/0222446 A1 Jul. 14, 2022

(30) Foreign Application Priority Data

Jan. 14, 2021 (IN) .............................. 202141001849

(51) Int. Cl.
| | | |
|---|---|---|
| *G06F 40/40* | (2020.01) | |
| *G06F 11/07* | (2006.01) | |
| *G06F 18/23* | (2023.01) | |
| *G06F 40/30* | (2020.01) | |

(52) U.S. Cl.
CPC ............ *G06F 40/40* (2020.01); *G06F 11/079* (2013.01); *G06F 18/23* (2023.01); *G06F 40/30* (2020.01)

(58) Field of Classification Search
CPC ........ G06F 40/40; G06F 11/079; G06F 18/23; G06F 40/30; G06F 11/0709; G06F 11/0754; G06F 18/213; G06F 18/24; G06F 16/2237; G06F 16/3329; G06F 16/3344; G06F 16/90332; G06Q 30/0202; G06N 20/00; G06N 3/088
See application file for complete search history.

(56) References Cited

U.S. PATENT DOCUMENTS

| | | | |
|---|---|---|---|
| 8,396,719 | B2 | 3/2013 | Patrick et al. |
| 10,484,541 | B2 | 11/2019 | Kannan et al. |
| 10,530,929 | B2 | 1/2020 | Raanani et al. |
| 10,715,668 | B1 * | 7/2020 | Jayapalan ............... G06Q 30/01 |
| 2010/0332287 | A1 | 12/2010 | Gates et al. |
| 2015/0066479 | A1 | 3/2015 | Pasupalak et al. |
| 2015/0170641 | A1 | 6/2015 | Kennewick et al. |
| 2017/0060656 | A1 | 3/2017 | Bhattacharya et al. |
| 2017/0140467 | A1 | 5/2017 | Neag et al. |
| 2017/0286978 | A1 * | 10/2017 | Govindarajan ....... G06F 16/951 |
| 2019/0311375 | A1 * | 10/2019 | Sapoznik ............ H04M 3/5141 |

\* cited by examiner

*Primary Examiner* — Yogeshkumar Patel
(74) *Attorney, Agent, or Firm* — Quarles & Brady LLP (57) ABSTRACT

Examples are described herein for facilitating responses to computing device service requests. In various examples, natural language processing may be performed on a plurality of incoming computing device service requests associated with a plurality of computing devices. A plurality of embeddings corresponding to the plurality of computing device service requests may be generated based on the natural language processing. Based on distances between each of a particular subset of the embeddings in an embedding space, a trending service issue associated with the computing device service requests corresponding to the particular subset may be predicted. The trending service issue may be provided to a computing device servicer associated with resolving a new incoming computing device service request.

15 Claims, 7 Drawing Sheets

PREDICTING SERVICE ISSUES

BACKGROUND

Computing devices such as laptop computers, smart phones, tablet computers, etc., as well as their constituent components, may malfunction, fail, or otherwise exhibit deficiencies (hereinafter "service issues") for innumerable reasons. These service issues may cause users of the computing devices to submit computing device service requests in which the users describe problems they are experiencing and request remediation. These computing device service requests may occur over various modalities, such as email, text messaging, telephone, instant messaging (with people or chatbots), webpage submission, etc. Given the complexity of modern computing devices, these service issues may be difficult to diagnose, not to mention resolve, which can result in dissatisfied users.

BRIEF DESCRIPTION OF THE DRAWINGS

Features of the present disclosure are illustrated by way of example and not limited in the following figure(s), in which like numerals indicate like elements.

DETAILED DESCRIPTION

Examples are described herein for facilitating and/or improving responses to computing device service requests, and for remediating service issues underlying those computing device service requests. In some examples, computing device service requests may be leveraged to identify service issues experienced by clusters of computing devices. For example, natural language processing (NLP) may be performed on historical computing device service requests in order to generate reduced-dimensionality feature vectors (referred to herein as "feature embeddings" or simply "embeddings").

In examples where service requests were made orally (e.g., over the phone), speech recognition may be employed to convert that speech into natural language text. In some examples, these embeddings may incorporate other "attributional" (e.g., diagnostic and/or contextual) data transmitted automatically by the computing devices associated with the service requests. Attributional data may include, for instance, position coordinates, heartbeat, battery health, memory usage, temperature, registered user/company, model/serial numbers (of the computing device and/or its constituent components), manufacturer/distributor (again, of the computing device and/or its constituent components), hardware/software specifications, locational data (user-provided and/or automatically-generated position coordinates), etc. For example, one embedding generated from text of a computing device service request may be combined (e.g., concatenated, averaged) with another embedding generated from attributional data transmitted by a computing device automatically.

Various NLP techniques may be employed to generate embeddings representative of computing device service requests. In some examples, statistical techniques such as bag-of-words or term frequency-inverse document frequency (TF-IDF) may be used to generate embeddings from natural language contained in service requests. In some implementations, machine learning-based techniques such as neural networks (e.g., word2vec), autoencoders, etc. may be employed to generate embeddings representing computing device computing device service requests.

In some examples, the generated embeddings may be grouped into clusters based on distances between them in embedding space. These distances correspond to semantic similarity between embeddings, and may be computed using various techniques, such as cosine similarity, dot product, etc. In the context of the present disclosure, each cluster may include embeddings that share a particular service issue. Various techniques may be employed to group embeddings into clusters, including but not limited to unsupervised techniques such as K-means clustering, partitioning methods, hierarchical cluster, fuzzy clustering, and so forth. In other examples, other types of classification techniques, such as K nearest neighbors (KNN), may be employed instead.

Once an embedding space is populated with embeddings (and those embeddings are grouped into semantically similar clusters where applicable), these data may be leveraged for a variety of purposes related to improving helpdesk support and/or computing device service issue remediation. In some examples, new incoming computing device service requests associated with computing devices experiencing service issues may be processed using the same or similar NLP techniques as described previously to generate new embeddings. In some examples these new embeddings may also be generated based on attributional data transmitted by the computing devices experiencing service issues. These new embeddings may then be compared to existing embeddings (whether clusters or individual embeddings) to determine which are most similar, and hence, which service issue to which the new incoming service request pertains.

In many cases, service issues may arise among contextually-similar computing devices at similar times. For example, a particular model of computing device (or a constituent component thereof) may tend to experience malfunction or failure after some amount of usage/time, e.g., due to a latent defect in the model. As another example, computing devices deployed in a particular geographic region (e.g., country, continent, etc.) may have been manufactured by a particular manufacturer and/or undergone a particular manufacturing process that introduced latent defects, which may tend to manifest within that particular region at similar times. Accordingly, in various examples, new trends in service issues may be detected using techniques described herein and leveraged in order to facilitate and/or improve responses to computing device service requests, and/or to remediate service issues underlying those computing device service requests.

Suppose some number of recently-received service requests relate to similar service issues of similar computing devices in a particular country. Embeddings generated from these service requests (and from automatically-transmitted attributional data, if applicable) using techniques described herein may tend to cluster together, e.g., rapidly growing preexisting clusters or forming new clusters. In either case, a trending service issue may be predicted and used to aid helpdesk personnel better respond to new computing device service requests that relate to the same or similar service issue(s). In some cases, two clusters may even relate to the same or similar service issues but may form separate clusters, e.g., because the underlying computing devices are deployed in different geographic areas, were manufactured by different entities, include different constituent components, etc.

As an illustrative example, suppose a new user calls a helpdesk and provides a description of the service issue they are experiencing. The new user's utterances (and in some cases, the helpdesk's utterances as well) may be speech recognized, e.g., at each turn of the dialog. NLP may be performed on the speech recognition output to generate an embedding. If this embedding is most or sufficiently proximate to a new or rapidly growing cluster, the new user's service issue may be predicted to be the same as a trending service issue represented by the new or rapidly growing cluster. Consequently, helpdesk personnel may be presented, e.g., on a display screen, information about the service issue, such as its nature, ways to resolve it, remediation facilities that may be able to assist, and so forth.

Figure 1:
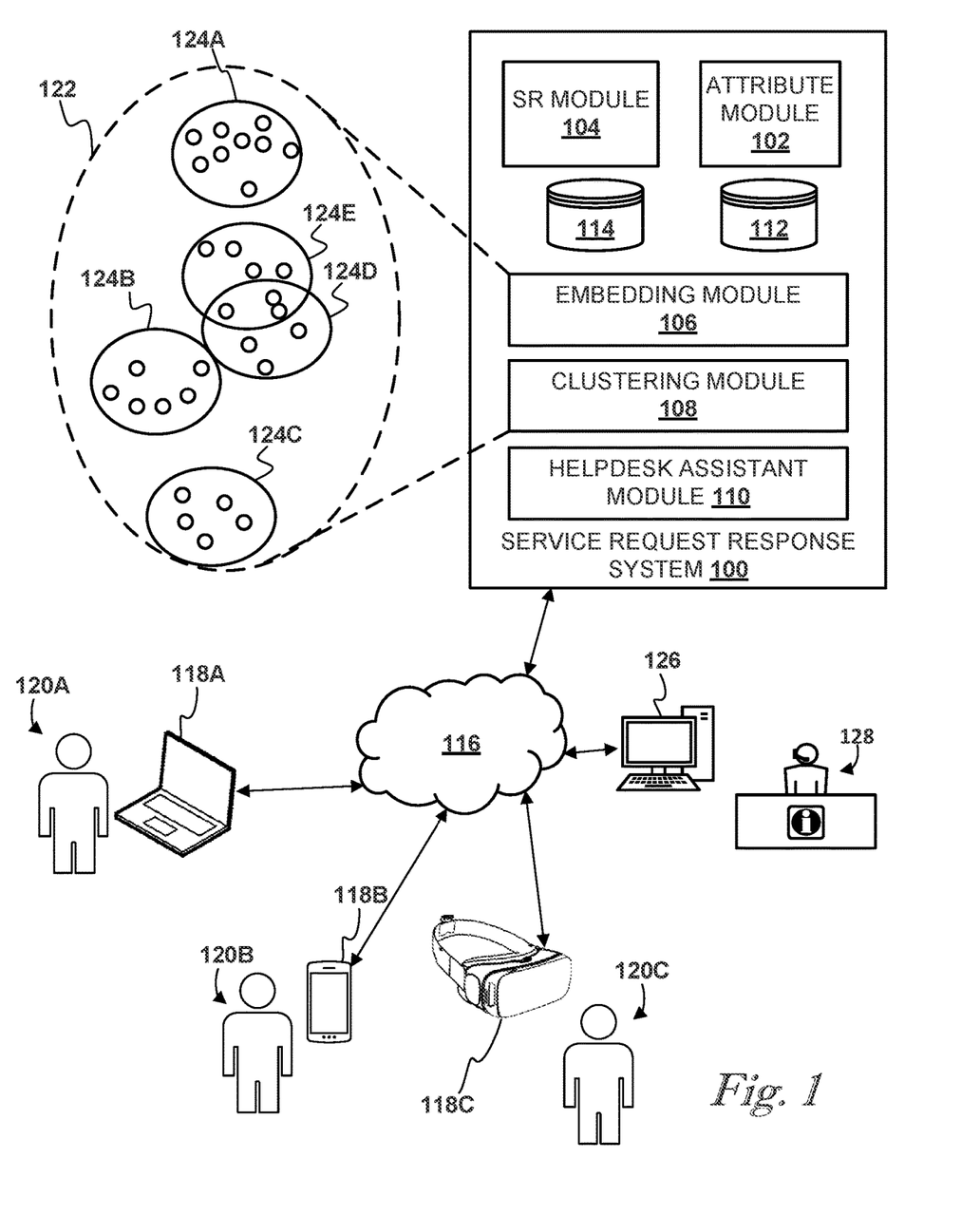
FIG. 1 schematically depicts an example environment in which selected aspects of the present disclosure may be implemented.

FIG. 1 schematically depicts an example environment in which selected aspects of the present disclosure may be implemented. A service request response system (SRRS) 100 may be implemented using computer system(s) such as computer server(s) that in some cases may form what is often referred to as a "cloud infrastructure" or simply the "cloud." SRRS 100 may include various elements that are to practice selected aspects of the present disclosure to facilitate responding to computing device service requests. In many examples, responding to such requests includes helpdesk personnel providing guidance to end users to remediate service issues. However, other types of responses are contemplated, such as recommending product updates or upgrades, implementing manufacturing changes (e.g., replacing defective constituent components with different constituent components across a particular model of computing device), implementing patches and/or other changes to computer-executable instructions (sometimes referred to as "software"), and so forth.

A plurality of computing devices 118A-C are depicted in FIG. 1 as being operated by a corresponding plurality of users 120A-C, and are communicatively coupled with SRRS 100 via wired and/or wireless computer network(s) 116 such as the Internet and/or local area network(s). Three computing devices 118A-C are depicted in FIG. 1, but it should be understood that service requests pertaining to any number of computing devices 118 may be managed using techniques described herein. A first computing device 118A takes the form of a laptop computer. A second computing device 118B takes the form of a tablet computer or smart phone. A third computing device 118C takes the form of a head-mounted display that provides an augmented reality (AR) and/or virtual reality (VR) experience for third user 120C. Other types of computing devices, such as desktop computers, vehicular computer systems, set top boxes, ambient computer systems, etc., are also contemplated. Also depicted in FIG. 1 is helpdesk personnel 128 that operates its own computing device 126. Computing device 126 may be used, for instance, to display suggestions to helpdesk personnel 128 during service request calls to expedite resolution of the service issue.

SRRS 100 includes an attribute module 102, a service request ("SR" in FIG. 1) module 104, an embedding module 106, a clustering module 108, and a helpdesk assistant module 110. Any of modules 102, 104, 106, 108, and 110 may be implemented using any combination of hardware and computer-executable instructions. For example, any of modules 102, 104, 106, 108, and 110 may be implemented using a processor that executes instructions stored in memory, a field-programmable gate array (FPGA), and/or an application-specific integrated circuit (ASIC). Any of modules 102, 104, 106, 108, and 110 may also be combined with others of modules 102, 104, 106, 108, and 110, may be omitted, etc.

SRRS 100 also includes a first database 112 that stores data associated computing devices 118A-C, such as attributional data obtained by attribute module 102 and/or service request data obtained by service request module 104. Attributional data may be transmitted by computing devices 118A-C to attribute module 102 manually by users 120A-C or automatically, e.g., periodically, continuously, on demand, etc. Attributional data may include, but is not limited to, attributes of computing devices 118A-C such as location (e.g., position coordinates, city/state/county/country, postal code, etc.), heartbeat, battery health, memory usage, temperature, registered user/company, model/serial numbers (of the computing device and/or its constituent components), manufacturer/distributor (again, of the computing device and/or its constituent components), hardware/software specifications, operating system, product stockkeeping unit (SKU), data about the device's basic input/output system (BIOS) or Unified Extensible Firmware Interface (UEFI) such as version, release data, latest version, etc., battery data (e.g., recall status, current health, serial number, warranty status), data about past errors/failures (e.g., date occurred, bug check code, driver/version, bug check parameters, etc.), firmware information, warranty information, peripheral information (e.g., display, docking station), drivers, software updates applied/available, uptime, performance metrics, and so forth.

Service request data obtained by service request module 104 may be unstructured data such as natural language provided by a user 120 of a computing device 118 that is experiencing some sort of service issue. As will be described in more detail herein, users 120A-C may submit service requests via various communication modalities (written or spoken). These unstructured service requests may be processed, e.g., by service request module 106 or embedding module 106 using NLP, to generate structured data such as embeddings that represent the underlying service requests. Given that service request data may include natural language composed/spoken by users, service request data can include innumerable types of information, such as a user's description of a service issue, a user's classification of a service issue selected from a list of enumerated options, and so forth. In many cases service request data obtained by service request module 104 may overlap with and/or be duplicative of attributional data obtained by attribute module 102. For example, a user 120 may register a computing device 118 as being located in a particular region, and at the same time, the computing device 118 itself may report data such as position coordinates that are usable to also determine the region.

Embedding module 106 may use a variety of techniques to convert unstructured service requests into structured data, particularly embeddings. For example, and as mentioned previously, embedding module 106 may employ statistical techniques such as bag-of-words or TF-IDF. In some examples, embedding module 106 may employ machine learning-based techniques such as neural networks (e.g., word2vec), encoder-decoder networks (particularly the encoder portions), etc. As shown at top left in FIG. 1, embeddings (represented by small circles) may correspond to coordinates in an embedding space 122.

In some examples, clustering module 108 may group the embeddings in embedding space 122 into clusters 124A-E. While five clusters 124A-E are depicted in FIG. 1, any number of clusters are possible, depending on how many different service issues are mapped in embedding space. Various clustering techniques mentioned previously, such as K-means clustering, may be employed. K is a positive integer that dictates how many clusters 124 are formed. In some examples, if there are n possible service issues, then K may be set to n. In other implementations, new clusters may emerge over time, and/or preexisting clusters may grow rapidly, in response to new service issues emerging. Thus, K (or parameters used to determine cluster counts for other clustering techniques) can be dynamic in many examples. Clusters 124A-E may be labeled with service issues either manually, automatically, or some combination of both. With automatic labeling, statistics NLP techniques (e.g., TF-IDF) may be employed in some examples to automatically define labels that are assigned to new clusters.

The service requests represented by individual embeddings are thusly classified based on their memberships with particular clusters. In other examples, however, techniques other than clustering may be employed to classify service requests. For example, classification techniques such as KNN may be employed to identify the K nearest neighbors of a given embedding. Those neighbors may then "vote" using their own attributes to determine how the given embedding is classified.

Figure 2:
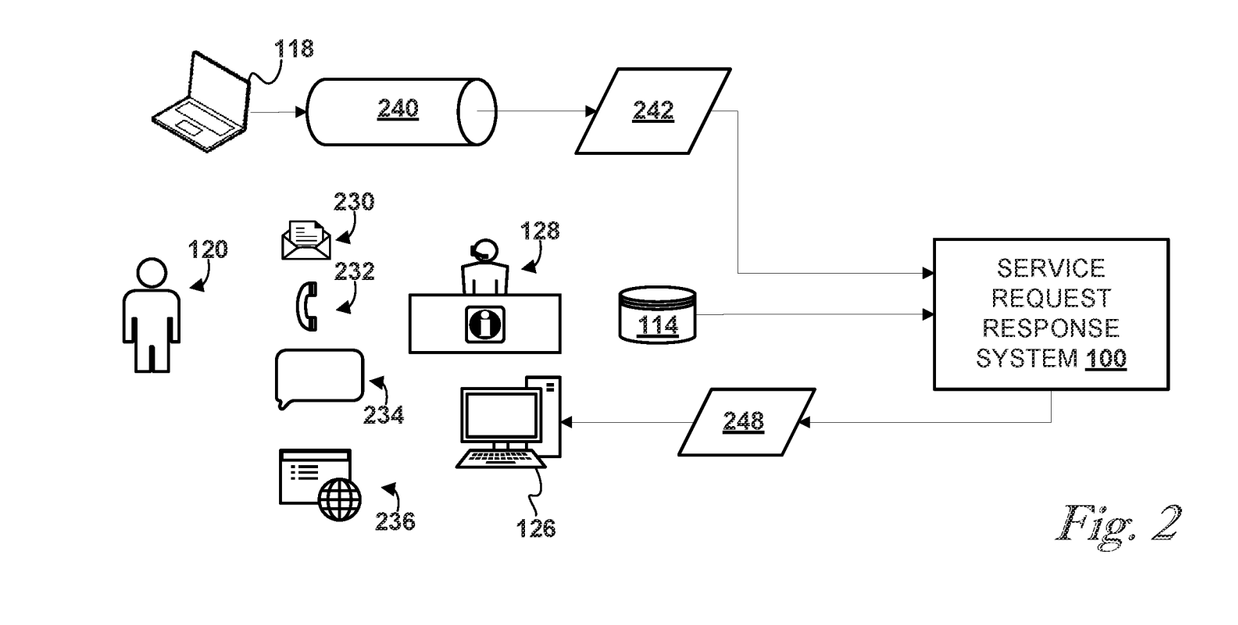
FIG. 2 schematically demonstrates an example of how data may be processed by various components to practice selected aspects of the present disclosure, in accordance with various examples.

FIG. 2 schematically demonstrates an example of how data may be processed by various components to practice selected aspects of the present disclosure, in accordance with various examples. In this example, a user 120 may communicate with helpdesk personnel 128 to convey a service issue in a computing device 118 (laptop in FIG. 2) operated by user 120. There may be multiple different modalities available for user 120 to communicate with helpdesk personnel 128, including but not limited to via asynchronous electronic correspondence 230 such as email or text messaging, telephone 232, online chat 234, or a service request submission webpage 236, to name a few. Other modalities may include, but are not limited to, proprietary applications operating on computing device 118 (which in some cases may also provide device health data), video calls, social media, and so forth.

In various implementations, information about a service issue in computing device 118 that us conveyed by user 120 to helpdesk personnel 128 in a service request may be stored in database 114. In instances where user 120 conveys the information orally (e.g., over the telephone 232 or video call), speech recognition processing may be performed on an audio recording of the user's speech to generate, and store in database 114, speech recognition textual output. As shown in FIG. 2, information in database 114 may be available to, and used by, SRRS 100 to perform selected aspects of the present disclosure.

Computing device 118 itself transmits attributional data to SRRS 100. In FIG. 2, for instance, computing device 118 provides attributional data to an analytics pipeline 240, which in various examples may be implemented on the same computing system(s) as SRRS 100, or may be implemented elsewhere, such as wholly or partially on computing device 118 itself. Data analytics pipeline 240 may process the attributional data in various ways, such as computing statistics, aggregating data, imputing missing data points, cleaning data, etc., such that preprocessed attributional data 242 can be provided to SRRS 100 in a suitable form.

Based on the service request provided by user 120 via modalities 230-236, as well as preprocessed attributional data 242, in some examples, SRRS 100 may generate an embedding corresponding to the computing device service request, e.g., using natural language processing techniques such as TF-IDF, neural networks, encoder-decoder networks (particularly the encoder portion), etc. Based on a distance between the newly-generated embedding and other preexisting embeddings in an embedding space (e.g., 122 in FIG. 1), SRRS 100 may identify a particular service issue associated with the computing device service request received from user 120 about computing device 118.

If the newly-generated embedding falls within a newly-emergent cluster (e.g., emerging in a recent time interval such as seconds, minutes, hours, days, etc.) or a preexisting but rapidly-growing cluster, SRRS 100 may identify the particular service issue as being part of a larger, trending service issue. As an example, suppose during a relatively short time interval, the same constituent component (e.g., hardware such as a battery, memory, etc.) begins to fail across multiple instances of a model of laptop. SRRS 100, e.g., by way of clustering module 108, may predict a trend that the constituent component is defective and/or is likely to fail elsewhere soon. SRRS 100 may, e.g., by way of helpdesk assistant module 110, provide the trending service issue to a computing device servicer associated with resolving a new incoming computing device service request. For example, SRRS 100, e.g., by way of helpdesk assistant module 110, may provide data 248 to computing device 126 that causes computing device 126 to output information about the service issue, such as diagnostic information, requests for user 120 to perform various actions to test the diagnosis, suggested solutions or questions to ask the user, etc.

Figure 3:
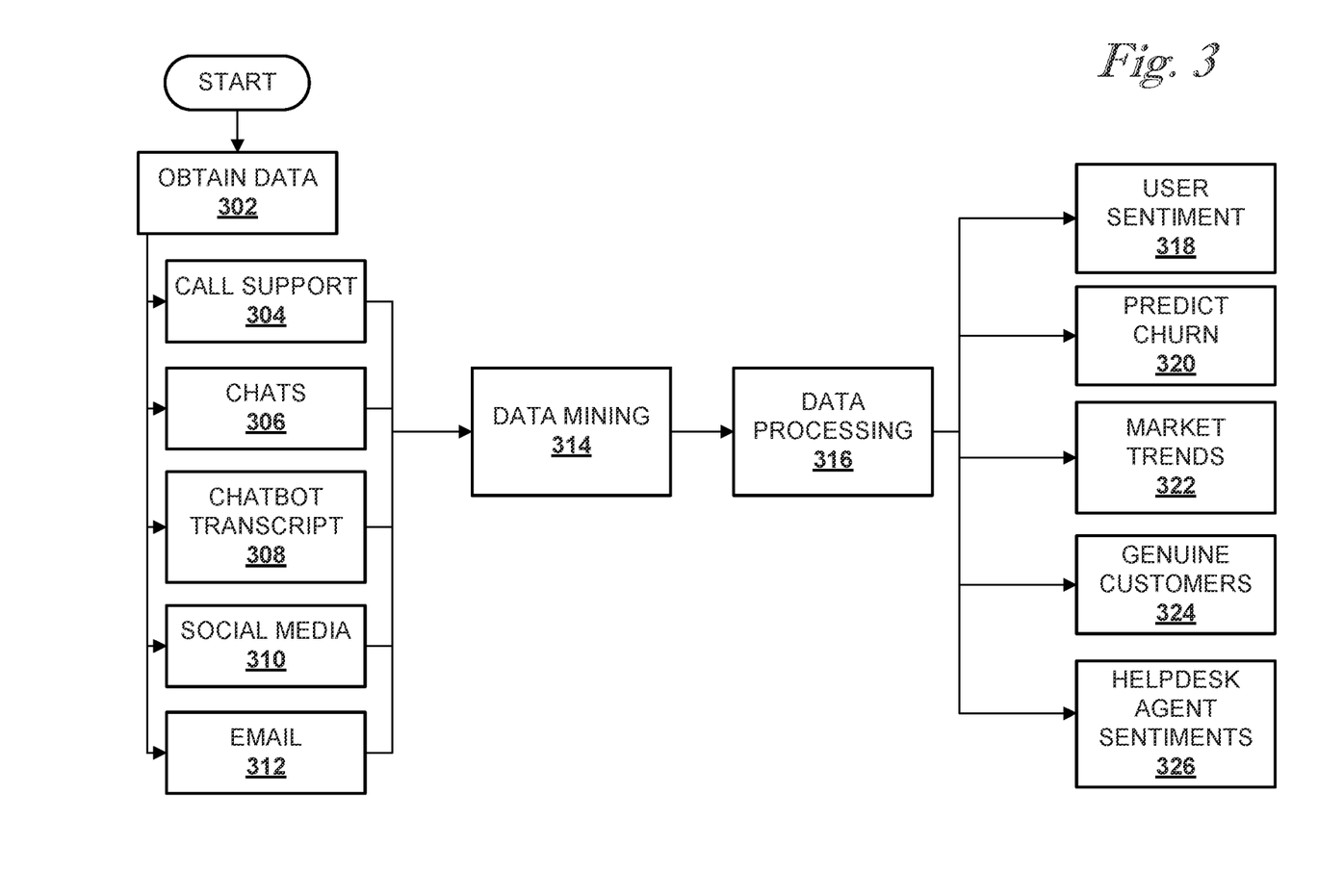
FIG. 3 schematically illustrates a broad overview of how historical data associated with computing devices and/or service requests may be mined and leveraged to facilitate techniques described herein.

In various examples, the embedding space (122 in FIG. 1) may be populated based on historical service request data. FIG. 3 schematically illustrates a broad overview of how historical data associated with computing devices and/or service requests may be mined and leveraged to facilitate techniques described herein. Starting at top left, at block 302, data may be obtained from a variety of different data sources. Call support data 304 may include telephoned service requests. If these data are in the form of audio recordings, then they may be speech recognized first to generate textual transcripts, which may be unstructured at this point. Other unstructured textual data may be obtained from other sources, such as from transcripts of online chats 306 between users 120 and helpdesk personnel 128, chatbots transcripts 308, social media posts 310, and email 312, to name a few.

At block 314, data mining may be performed on data obtained from the various data sources 304-312. For example, feature extraction may be performed to obtain pertinent data such as keywords, phrases, etc. Non-pertinent data and/or noise such as common words (e.g., "the," "a," "for," "he," "she," etc.), boilerplate language, salutations, may be removed/discarded. To the extent data sources 304-312 largely include unstructured data, various NLP techniques (statistical and/or machine-learning based) and/or tokenization may be performed at block 314 to generate structured data, e.g., in the form of embeddings.

At block 316, data processing may be performed on the structured data (or in some cases, the data processing 316 may include converting unstructured data to structured data). Based on the processing of block 316, various inferences may be made by SRRS 100. One prediction or inference that may be made is a measure of user sentiment at block 318. User sentiment can be numeric and/or discrete (e.g., positive, neutral, negative). Another prediction is "churn" at block 320. A churn prediction is a prediction of whether a given user will stop using a product, such as a computing device, as a result of the service issue experienced by user 120 and the user's experience with helpdesk personnel 128 to remediate the issue. Churn may be predicted in whole or in part based on sentiment in some examples—a strongly negative service request followed by a neutral or negative dialog with helpdesk personnel 128 may be highly likely to lead to churn of user 120.

In some examples, market trends may be predicted at block 322. These trends may predict how well a product such as a computing device model will sell in light of, for instance, service requests (and their sentiments) associated with the computing device. In some examples, at block 324, users or customers may be predicted to be genuine or not based on the service requests. Market trends 322 and genuine customer data 324 may be used for, among other things, attempting to upsell or cross sell products. If a user is genuinely interested in a product such as a computing device and predicted market trends show that another similar, but perhaps better equipped, computing device as having increased sales, that better-equipped computing device may be suggested to the user, especially if the computing device currently used by the user is out-of-date or obsolete. In some examples, at block 326, helpdesk personnel sentiments may also be determined, e.g., to help train helpdesk personnel 128 to perform better or more efficiently in the future.

Figure 4:
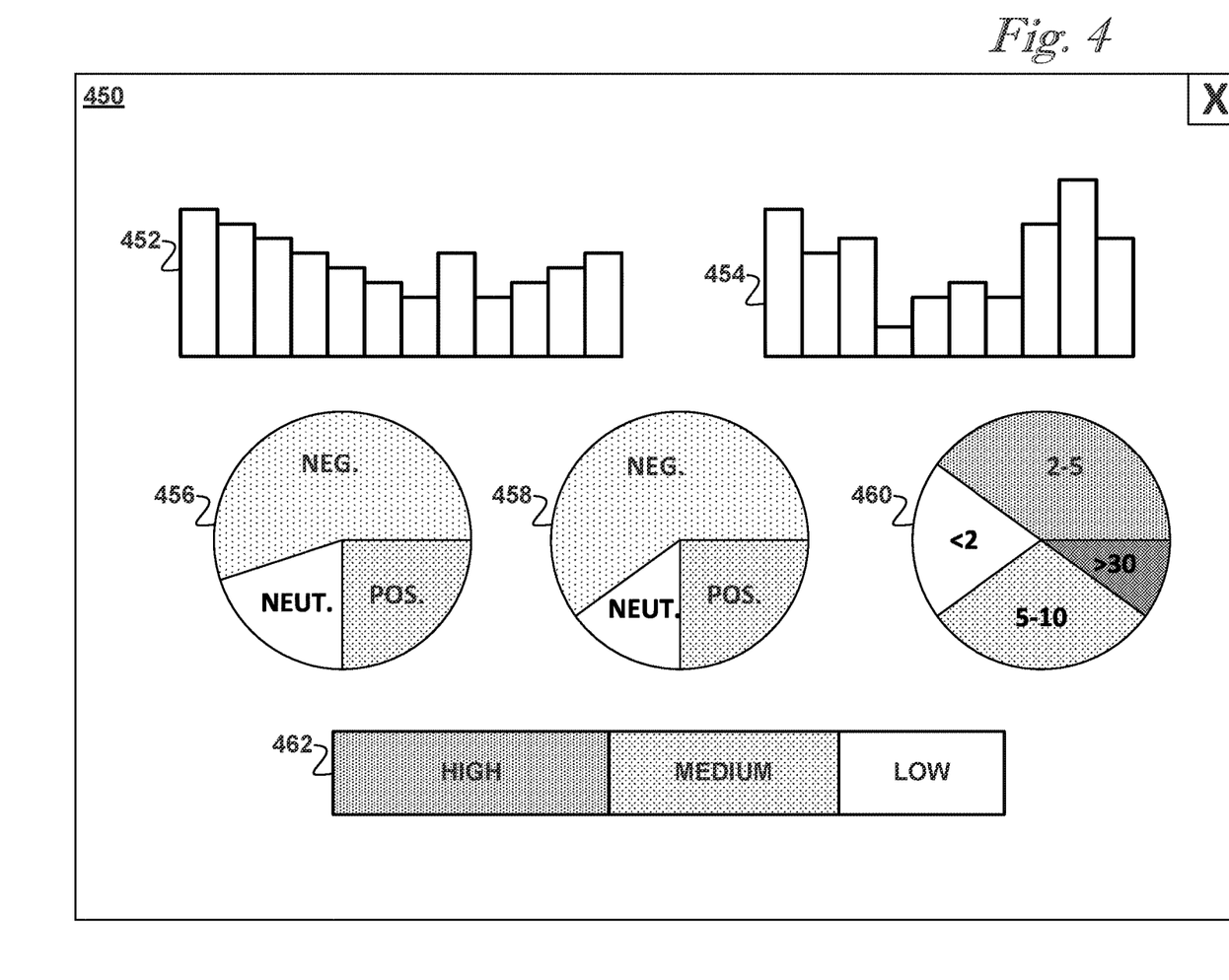
FIG. 4 depicts an example graphical user interface (GUI) that includes an "executive dashboard" conveying various predictions made based on service request and/or attributional data.

FIG. 4 depicts an example graphical user interface (GUI) 450 that includes an "executive dashboard" conveying various predictions made based on service request and/or attributional data. Various types of predictions may be included in such a dashboard, such as a first bar chart 452 representing monthly call counts and a second bar chart representing frequency of a variety of reasons behind customer churn.

Other charts may be included as well. For example, a first pie chart 456 conveys user (120) sentiments observed in service requests, and includes three categories: positive, neutral, and negative. A second pie chart 458 also conveys sentiments, except for helpdesk personnel (128) rather than for users. A third pie chart 460 conveys durations of service request calls, such as less than two minutes, two-to-five minutes, etc. A bottom chart 462 conveys churn prediction.

Figure 5:
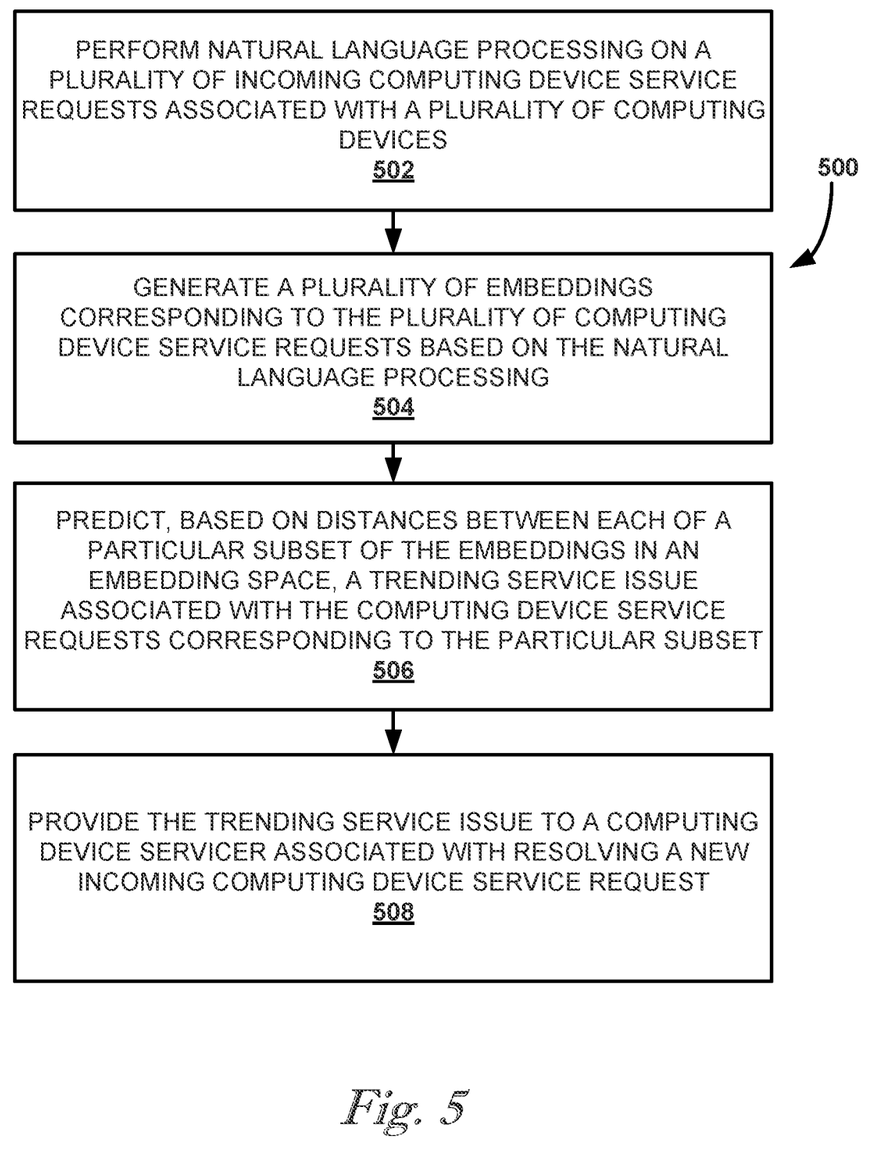
FIG. 5 depicts an example method for practicing selected aspects of the present disclosure, in accordance with various examples.

FIG. 5 depicts an example method 500 for practicing selected aspects of the present disclosure, in accordance with various examples. For convenience, the operations of method 500 will be described as being performed by a system, which may include, for instance, SRRS 100. The operations of method 500 may be reordered, and various operations may be added and/or omitted.

At block 502, the system, e.g., by way of service request module 104 or embedding module 106, may perform NLP on a plurality of incoming computing device service requests associated with a plurality of computing devices. In some examples, this NLP may be performed on a single communication, such as a service request submitted by a user on a website. In some cases, the NLP may be performed at each turn of a multi-turn dialog, such as an online chat session, chatbots session, telephone call, etc. For example, additional NLP may be performed on user-provided data after each turn of the multi-turn dialog between the user and the computing device servicer (e.g., helpdesk personnel 128) to resolve the new incoming computing device service request.

At block 504, the system may generate a plurality of embeddings corresponding to the plurality of computing device service requests based on the natural language processing. In some implementations, the plurality of embeddings may be generated using statistical NLP techniques such as TF-IDF. In some implementations, the plurality of embeddings may be generated using a trained machine learning model, such as a neural network, an encoder portion of an autoencoder, etc. If the service request is part of a multi-turn dialog, then a new embedding may be generated after each turn of the dialog.

In some implementations, the plurality of embeddings may be generated to include additional attributes of the plurality of computing devices that are transmitted automatically by the plurality of computing devices, such as the attributional data mentioned previously. The additional attributes may include, but are not limited to: respective locations of the plurality of computing devices; model numbers of the plurality of computing devices or constituent components thereof; serial numbers of the plurality of computing devices or constituent components thereof; manufacturers of the plurality of computing devices; distributors of the plurality of computing devices; and/or computing device diagnostic data provided by the plurality of computing devices. In some implementations, location data in particular may be used to identify trends among computing devices manufactured, assembled, and/or distributed by a particular entity associated with a particular geographic area.

At block 506, the system may predict, based on distances between each of a particular subset of the embeddings in an embedding space, a trending service issue associated with the computing device service requests corresponding to the particular subset. In some examples, the predicting may be based on preexisting embeddings in the embedding space (e.g., 122 in FIG. 1) that correspond to historical computing device service requests. For example, the preexisting embeddings may be grouped into a plurality of clusters (124A-E) as shown in FIG. 1. Each of the clusters may correspond to one of a plurality of service issues, such as "battery failure," "battery swelling," "operating system bug," "device driver issue," etc. In some implementations, the trending service issue may be predicted based on the most proximate cluster of the plurality of clusters to the particular subset of the embeddings. In other implementations, other classification techniques, such as KNN, support vector machines, etc., may be employed.

At block 508, the system may provide the trending service issue to a computing device servicer associated with resolving a new incoming computing device service request. In some examples in which the service request is part of a multi-turn dialog, data associated with a trending service issue may be provided to the computing device servicer based on the new embedding generated at each turn, e.g., such that in some examples, one predicted service issue may be predicted and provided to the computing device servicer based on a first dialog turn of the dialog, and a different service issue may be predicted and provided to the computing device servicer based on a subsequent dialog turn of the dialog.

Figure 6:
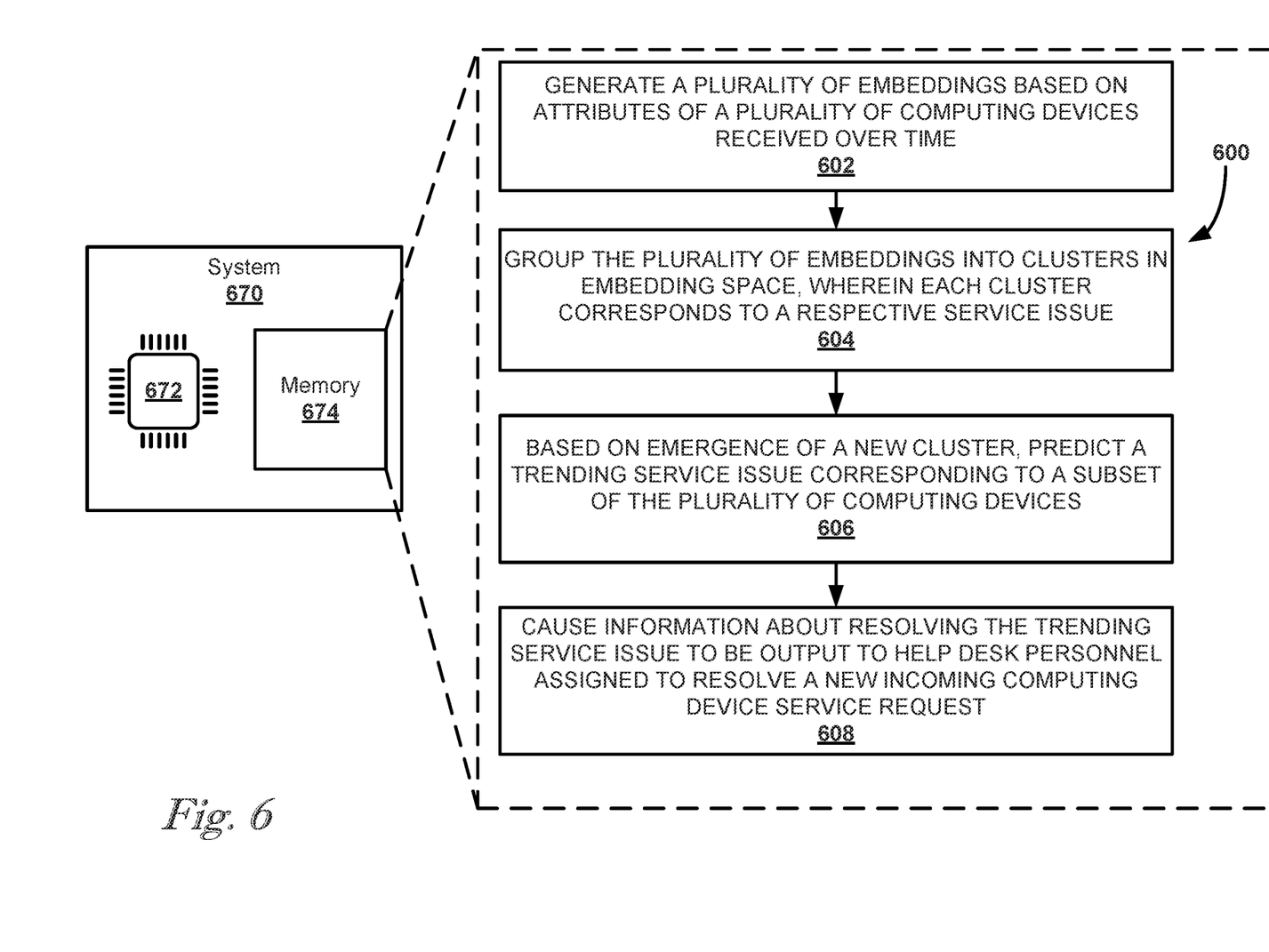
FIG. 6 shows a schematic representation of a system, according to an example of the present disclosure.

FIG. 6 shows a schematic representation of a system 670, according to an example of the present disclosure. System 670 includes a processor 672 and memory 674 that stores non-transitory computer-readable instructions 600 for performing aspects of the present disclosure, according to an example.

Instructions 602 cause processor 672, e.g., by way of embedding module 106, to generate a plurality of embeddings based on attributes of a plurality of computing devices received over time. These attributes may be attributional data transmitted by the computing devices periodically and/or extracted from service requests made on behalf of the computing devices.

Instructions 604 cause processor 672, e.g., by way of clustering module 108, to group the plurality of embeddings into clusters (e.g., 124A-E) in embedding space (e.g., 122). Each cluster may correspond to a respective service issue. Based on emergence of a new cluster, instructions 606 may cause processor 672 to predict a trending service issue corresponding to a subset of the plurality of computing devices. Instructions 608 cause processor 672 to cause information about resolving the trending service issue to be output to help desk personnel assigned to resolve a new incoming computing device service request.

Figure 7:
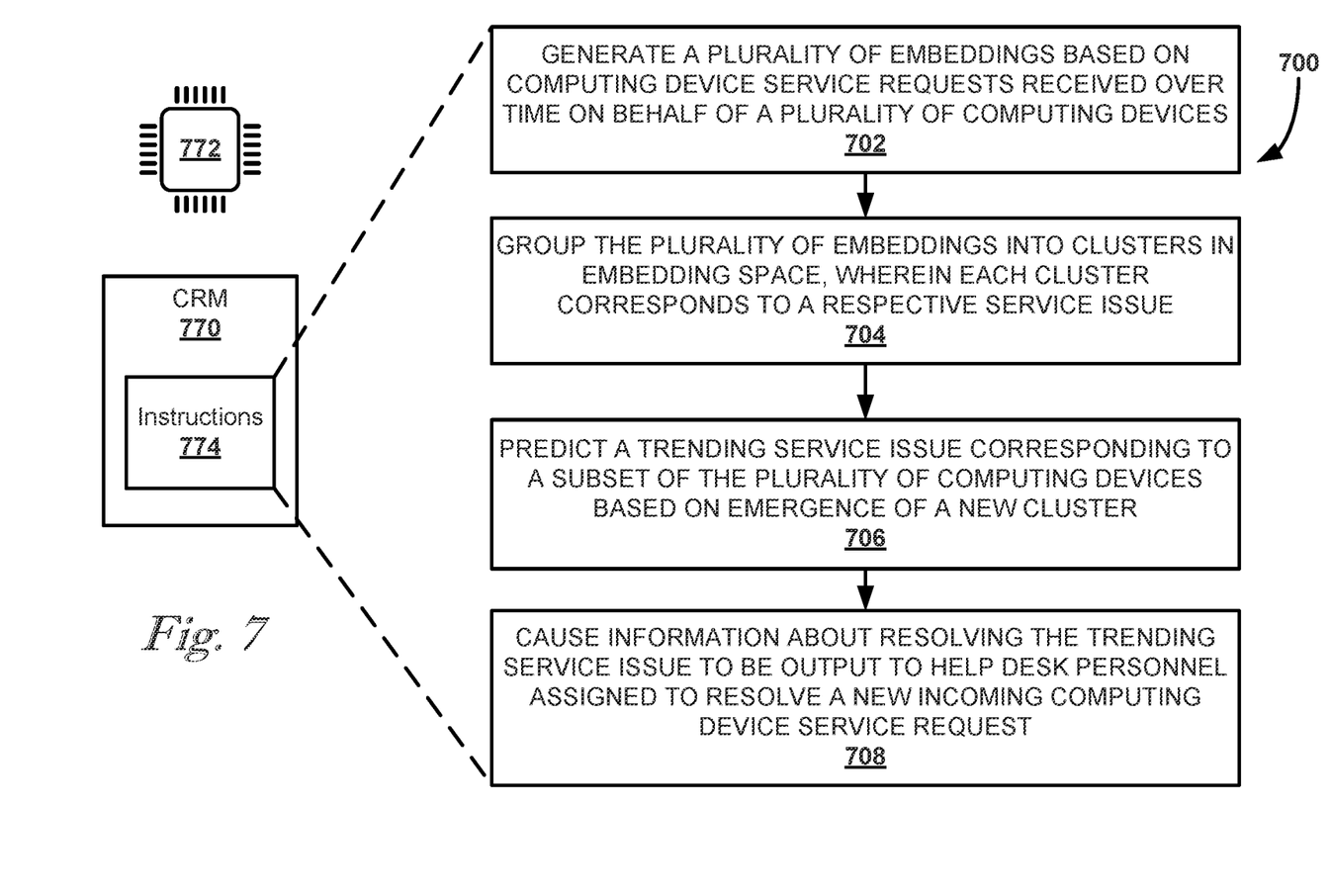
FIG. 7 shows a schematic representation of a non-transitory computer-readable medium, according to an example of the present disclosure.

FIG. 7 shows a schematic representation of a non-transitory computer-readable medium (CRM) 772, according to an example of the present disclosure. CRM 770 stores computer-readable instructions 774 that cause the method 700 to be carried out by a processor 772.

At block 702, processor 772 may generate a plurality of embeddings based on computing device service requests received over time on behalf of a plurality of computing devices. At block 704, processor 772 may group the plurality of embeddings into clusters in embedding space, wherein each cluster corresponds to a respective service issue. Based on emergence of a new cluster, at block 706, processor 772 may predict a trending service issue corresponding to a subset of the plurality of computing devices. At block 708, processor 772 may cause information about resolving the trending service issue to be output to help desk personnel assigned to resolve a new incoming computing device service request.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method comprising:
   performing natural language processing on a plurality of incoming computing device service requests associated with a plurality of computing devices;
   generating a plurality of embeddings corresponding to the plurality of incoming computing device service requests based on the natural language processing;
   predicting, based on distances between each of a particular subset of the plurality of embeddings in an embedding space, a trending service issue associated with the computing device service requests corresponding to the particular subset; and
   providing the trending service issue to a computing device servicer associated with resolving a new incoming computing device service request.

2. The method of claim 1, wherein the plurality of embeddings are generated using term frequency-inverse document frequency (TF-IDF).

3. The method of claim 2, wherein the predicting is further based on preexisting embeddings in the embedding space that correspond to historical computing device service requests.

4. The method of claim 3, wherein the preexisting embeddings are grouped into a plurality of clusters, each of the plurality of clusters corresponding to one of a plurality of service issues, and wherein the trending service issue is predicted based on the most proximate cluster of the plurality of clusters to the particular subset of the embeddings.

5. The method of claim 1, wherein the plurality of embeddings include additional attributes of the plurality of computing devices that are transmitted automatically by the plurality of computing devices.

6. The method of claim 5, wherein the additional attributes include:
   respective locations of the plurality of computing devices;
   model numbers of the plurality of computing devices or constituent components thereof;
   serial numbers of the plurality of computing devices or constituent components thereof; or
   computing device diagnostic data provided by the plurality of computing devices.

7. The method of claim 1, comprising:
   performing additional natural language processing on user-provided data after each turn of a dialog between a user and the computing device servicer to resolve the new incoming computing device service request; and
   based on the additional natural language processing, generating a new embedding after each turn of the dialog;
   wherein the trending service issue is provided to the computing device servicer based on the new embedding.

8. The method of claim 7, wherein the predicted service issue is predicted and provided to the computing device servicer based on a first dialog turn of the dialog, and wherein a different service issue is predicted and provided to the computing device servicer based on a subsequent dialog turn of the dialog.

9. A system comprising a processor and memory storing instructions that, in response to execution by the processor, cause the processor to:
   generate a plurality of embeddings based on attributes of a plurality of computing devices received over time;
   group the plurality of embeddings into clusters in embedding space, wherein each cluster corresponds to a respective service issue;
   based on emergence of a new cluster, predict a trending service issue corresponding to a subset of the plurality of computing devices; and cause information about resolving the trending service issue to be output to help desk personnel assigned to resolve a new incoming computing device service request.

10. The system of claim 9, wherein the attributes include locations of the plurality of computing devices.

11. The system of claim 10, wherein the plurality of embeddings are grouped into the clusters based on the locations of the plurality of computing devices.

12. The system of claim 11, wherein the attributes include computing device diagnostic data, and the plurality of embeddings are grouped into the clusters further based on the computing device diagnostic data.

13. A non-transitory computer-readable medium comprising instructions that, in response to execution by a processor, cause the processor to:
generate a plurality of embeddings based on computing device service requests received over time on behalf of a plurality of computing devices;
group the plurality of embeddings into clusters in embedding space, wherein each cluster corresponds to a respective service issue;
based on emergence of a new cluster, predict a trending service issue corresponding to a subset of the plurality of computing devices; and
cause information about resolving the trending service issue to be output to help desk personnel assigned to resolve a new incoming computing device service request.

14. The non-transitory computer-readable medium of claim 13, wherein one of the computing device service requests comprises a multi-turn dialog between a user and helpdesk personnel, and a new embedding is generated at each turn of the multi-turn dialog.

15. The non-transitory computer-readable medium of claim 13, wherein data indicative of an embedding generated at one turn of the multi-turn dialog is provided as input to a trained machine learning model at a subsequent turn of the multi-turn dialog, along with a new embedding generated from natural language input provided by the user at the subsequent turn.

* * * * *